United States Patent Office 2,948,570
Patented Aug. 9, 1960

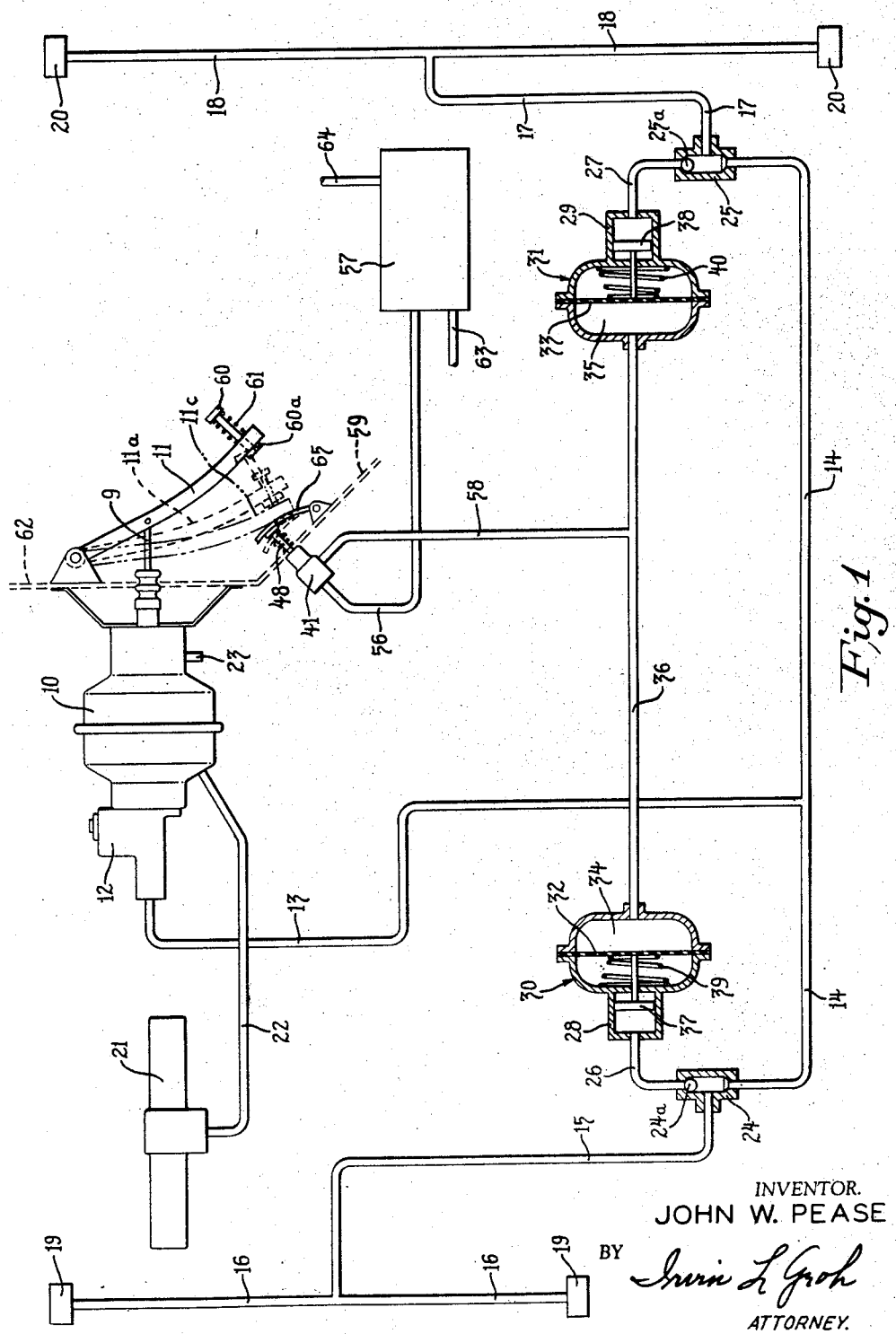

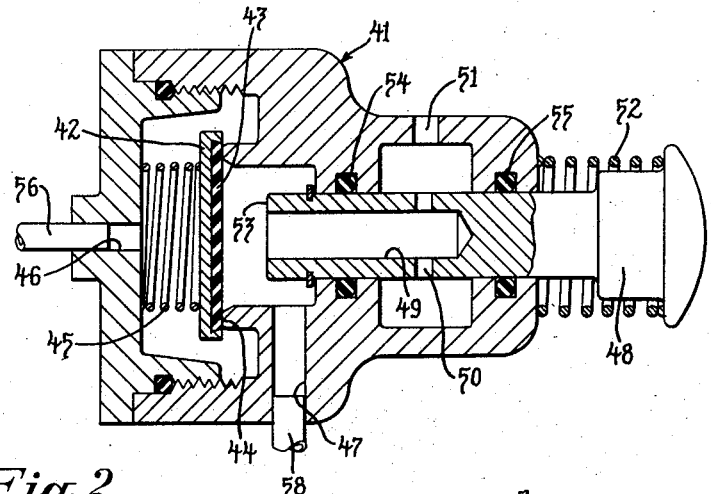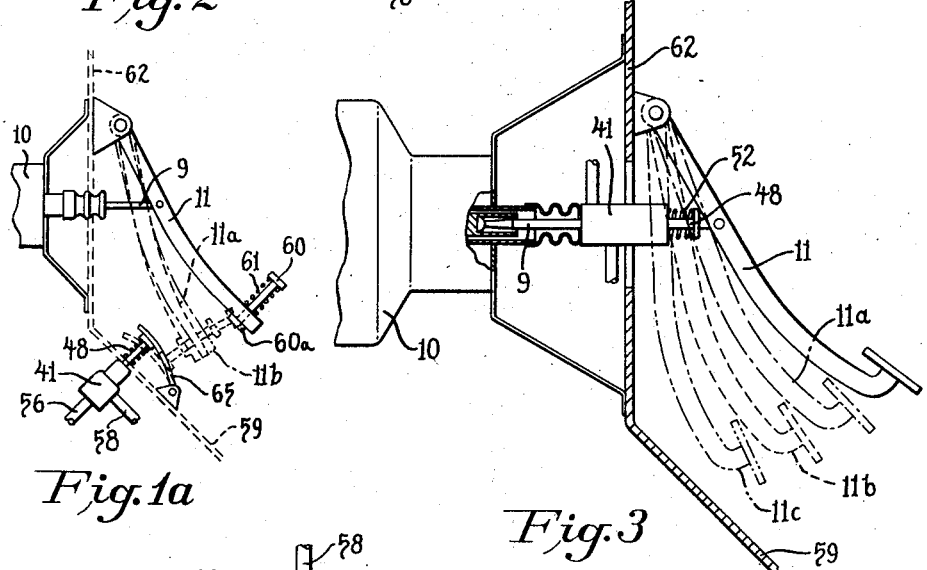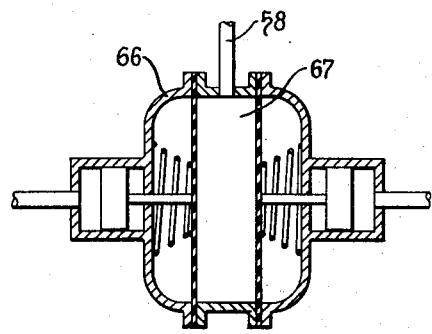

2,948,570

EMERGENCY BRAKE SYSTEM INCLUDING LOW BRAKE PEDAL

John W. Pease, Hartsdale, N.Y., assignor to Midland-Ross Corporation, a corporation of Ohio Filed Nov. 25, 1957, Ser. No. 698,570

3 Claims. (Cl. 303—63)

This invention relates to vehicle power brake systems and more particularly to an improved emergency power brake system applicable to vehicles equipped with a power actuated hydraulic service brake system and a separate pneumatic system normally disassociated with the brake system of the vehicle.

Conventional hydraulic brake systems, without booster motors, employ a relatively high brake pedal in order to provide the necessary pedal stroke or leverage to displace fluid from the master cylinder. It is more advantageous to place the pedal pad of the brake lever in a relatively low position close to the floor board to facilitate the transferring of the driver's foot between the accelerator pedal and the brake pedal. However, this decreases the stroke of the pedal, which will be available to displace fluid for braking.

A brake system with low pedal pad is made possible by the use of booster mechanisms in which the booster motor performs a substantial part of the work in applying the brakes, thus permitting the stroke of the pedal to be reduced. Such a system is satisfactory as long as the booster motor remains in effective operating condition. However, in conventional arrangements of this type, failure of the booster, as for example by loss of power source for the booster or failure in the booster motor itself, results in loss of satisfactory braking since sufficient pedal stroke and leverage is not available for manual operation of the brakes.

It is an object of this invention to provide a cooperating service and emergency brake system in which power is made available for both service and emergency brake applications and wherein a relatively low pedal pad arrangement can be employed without sacrifice of safety.

Another object of the invention is to provide an improved, simple, and reliable power emergency brake system.

A further object of the invention is to provide an improved emergency power brake system operable upon failure in the service brake system and manual operation of the foot pedal to effect emergency brake application.

These and other objects and advantages are attained by the present invention, various novel features of which will be apparent from the following description and from the accompanying drawings disclosing a preferred embodiment of the invention.

Referring to the drawings:

Fig. 1 is a diagrammatic view, partly in cross-section, of an emergency and service brake system incorporating the invention;

Fig. 1a is a view of a portion of the foot pedal arrangement in Fig. 1 but showing a different condition of operation;

Fig. 2 is an enlarged cross-sectional view of the control valve used in the system;

Fig. 3 is a view of an alternate to the embodiment of the invention shown of Fig. 1 showing an emergency operation of the foot pedal; and Fig. 4 is an enlarged cross-sectional view of a modified secondary booster.

Shown diagrammatically in Fig. 1 is a service brake system which includes vacuum suspended booster 10 connected by an actuating rod 9 to a foot pedal 11. On depression of the foot pedal a master cylinder 12 forces fluid under pressure through hydraulic fluid lines 13 to 18, inclusive, to fluid pressure responsive brake motors 19 and 20. The brake motors 19 and 20 are associated, respectively, with the front and rear axle brakes (not shown) of the vehicle. Power for operating the booster 10 is derived from the engine manifold 21 connected to the booster by a pneumatic line 22. A vacuum power brake system of this type is conventional and no claim is made to the system per se. Any suitable vacuum booster may be coupled directly to the foot pedal as in Fig. 1 or coupled to the foot pedal through a hydraulic conduit and a master cylinder for actuation. The particular booster construction forms no part of the invention and reference may be made to U.S. Patent #2,767,548 issued October 23, 1956 to D. T. Ayers, Jr., for details of a suitable booster.

In operation of such a conventional hydraulic booster brake system, depression of the foot pedal 11 forces hydraulic fluid under pressure from the master cylinder 12 to the brake motors 19 and 20 until brake slack is taken up and a sufficient brake pressure is developed to actuate valve mechanism (not shown) in the booster 10. This introduces atmospheric pressure to the booster through atmospheric port 23 and the booster is actuated to add vacuum power to the manual effort forcing fluid under pressure to the brake motors. Upon failure of the booster, as for example, on failure of the vacuum source 21, the brakes are applied solely by manual effort from the foot pedal acting on the hydraulic fluid.

A difficulty experienced with the above described hydraulic brake system is that failure of any of the motors 19 or 20, or the master cylinder 12 or any of the lines therebetween, results in complete failure of the braking system due to loss of fluid with which to effect braking. To avoid this difficulty various forms of flow control valves have been proposed to isolate any brake motor or pair of brake motors associated with a fault to maintain fluid in the remainder of the system. This approach has not been commercially accepted because of the unreliable nature of such devices and the possibility of undesired operation which might result in loss of braking due to unusual surge flow where no fault had occurred. A second and perhaps more reliable approach is to provide the booster with a separate cylinder and piston for each brake axle of the vehicle so that upon failure in the brake motors or lines associated with one axle, braking remains effective on the remaining axle. This has resulted in difficulties since such systems do not protect for a fault in the master cylinder 12 or the line 13 or for loss of power braking on failure of the vacuum source 21 or the booster 10.

Another difficulty with conventional service brake systems is the high brake pedal or long pedal stroke which is required to provide the necessary leverage for effecting satisfactory manual braking upon loss of power braking through failure of the booster 10 or loss of the source 21. The latter example is quite frequently encountered in towing or pushing a vehicle to start the engine and is also encountered on a laboring or stalled engine.

Each of the above mentioned difficulties is solved in a simple, inexpensive manner by the preferred embodiment of the invention which, as shown in Fig. 1 includes double acting check valves 24 and 25 disposed between line 14 and each of the lines 15 and 17. During normal service brake operation pressure fluid passes from line 14 through check valves 24 to line 15 and through check valve 25 to line 17.

Check valve 24 is connected by line 26 to a hydraulic cylinder 28 forming part of secondary fluid pressure boosters 30. In like manner, check valve 25 is connected by line 27 to a hydraulic cylinder 29 of another secondary booster 31. The boosters 30 and 31 are provided with flexible diaphragm members 32 and 33 defining, respectively, working chambers 34 and 35 communicating through a common line 36. The diaphragms 32 and 33 are connected to pistons 37 and 38, respectively, in the cylinders 28 and 29 to force hydraulic fluid under pressure through lines 26 and 27 upon the admission of fluid under pressure to the working chambers 34 and 35 and are biased inwardly to a retracted position of the pistons by return springs 39 and 40.

The supply of fluid under pressure to the working chambers 34 and 35 is controlled by a manually actuated valve 41 which as shown in Fig. 2 has an inlet valve 42 with a resilient sealing insert 43 adapted to seal on a concentric lip type valve seat 44 under the bais of a spring 45 to interrupt communication between an inlet port 46 and a delivery port 47. Valve 41 also includes a slidable plunger 48 having a central recess 49 and radial apertures 50 to provide communication between delivery port 47 and an exhaust port 51 in the body of the valve. The plunger 48 is biased by a spring 52 to a released position as shown in Fig. 2. Upon movement of the plunger against the bias of the spring 52, an inner annular end 53 of the plunger 48 engages the insert 43 of the valve 42 to interrupt communication between the port 47 and exhaust port 51. Upon further movement of the plunger inlet valve 42 is moved against the bias of spring 45 to provide communication between inlet port 46 and outlet port 47. Suitable O ring seals 54 and 55 are provided to prevent the passage of fluid under pressure between the plunger 48 and the body of the valve.

The inlet port 46 of valve 41 is placed in communication with a source of pneumatic fluid pressure on the vehicle which is normally used for vehicle accessories other than the brake systems. As seen in Figs. 1 and 2, fluid under pressure is passed to inlet port 46 by a line 56 connected to a pneumatic suspension reservoir 57 of the vehicle. Communication between delivery port 47 of valve 41 and working chambers 34 and 35 of fluid motors 30 and 31 is afforded by a line 58 connected to line 36. It is to be understood that although a particular valve 41 has been described for an understanding of the operation of the brake system, other suitable valves can be employed.

Under normal operation of the service brake system the foot pedal 11 pivots relative to the fire wall 62 in the range between the full line position and the dotted line position indicated at 11a in Fig. 1. However, upon loss of hydraulic fluid in the system the pedal may be depressed beyond position 11a to the position indicated at 11c so that pedal 11 engages an arm 65 pivoted on the floor board 59. The arm 65 engages plunger 48 and actuates valve 41 which results in the passage of air under pressure from the pneumatic suspension reservoir 57 to the chambers 34 and 35 of boosters 30 and 31 to force hydraulic fluid through lines 26 and 27 to check valves 24 and 25. Upon receiving hydraulic fluid, elements 24a and 25b of the check valves are moved to block line 14 and pass pressure fluid to lines 15 and 17 for applying emergency power braking.

Faults which could result in overtravel of the foot pedal 11 to thereby effect emergency braking in the manner described above include loss of hydraulic fluid from any of the lines 13 through 18 inclusive or from the seals in fluid motors 19 and 20 resulting in depletion of fluid in the master cylinder 12. Upon loss of fluid pressures from lines 13 or 14 overtravel of the foot pedal would result in emergency braking on both axles of the vehicle. Upon loss of fluid from lines 15 or 16 or brake motors 19, braking on the front axle would be lost and emergency braking would be effective on the rear axle associated with brake motors 20. In the same manner, if fluid is lost from a fault in lines 17 or 18 or brake motors 20, braking on the rear axle is lost and emergency braking remains effective on the front axle associated with brake motors 19.

If power braking is lost in the service brake system as a result of loss of vacuum source 21, or a fault in line 22 or the booster 10, no overtravel of the brake pedal 11 will result because hydraulic fluid remains in the system to resist movement of the pedal. However, with a low brake pedal there will not be sufficient mechanical leverage to force the hydraulic fluid to effect satisfactory braking. Under this condition the operator could effect emergency braking by depressing the plunger 48 with his foot disregarding the foot pedal 11 to thereby effect emergency braking. The valve 41 also could be mounted on the dash for hand operation. However, in Fig. 1 means for actuating the plunger 48 is shown in the form of a preloaded spring means associated with the pedal 11 and valve 41 to effect emergency braking in response to abnormal manual effort on the pedal when overtravel of the foot pedal does not occur. More particularly, the foot pedal 11 is provided with a plunger 60 preloaded or biased by a spring 61 to a released position. Under normal service brake operation the operator's foot is applied to the plunger 60 so that the pedal 11 and plunger 60 move as a unit. However, when hydraulic fluid resists movement of the pedal, application of an abnormal force to the plunger 60 moves it relative to the foot pedal 11 so that its end 60a engages and depresses the pivoted arm 65 as indicated in 11b in Fig. 1a. This moves the plunger 48 and actuates the emergency brake system as previously described.

From the foregoing it will be apparent that upon loss of hydraulic fluid in the service brake system the plunger 60 and foot pedal 11 will overtravel the normal position and move to the position indicated at 11c in Fig. 1 to actuate the emergency braking system. However, upon failure of the vacuum system the foot pedal 11 will move to the position indicated at 11a where further movement will be resisted by hydraulic fluid. Upon continued application of force to plunger 60 it will move relative to the pedal as shown at 11b in Fig. 1a to actuate the valve 41 and apply the brakes.

It should be noted that the brakes can be held in any desired degree of braking by release of the foot pedal to lap position of the valve 41 or completely released by release of the foot pedal to exhaust position of the valve 41 in which air is exhausted from chambers 34 and 35 through lines 36 and 58 and the exhaust port 51 of valve 41. The brakes can also be reapplied as many times as the supply of air in the reservoir 57 permits. It should be noted that since emergency braking is effected by power means, a large pedal stroke to obtain the needed mechanical advantage is no longer required and the foot and accelerator pedals can be mounted at the same height from the floor level. Also, since the fluid pressure in the pneumatic suspension reservoir 57 is considerably in excess of the differential pressure available from engine vacuum, the secondary boosters 30 and 31 may be relatively small as compared to the booster 10. Fluid under pressure may be supplied to the pneumatic suspension reservoir 57 through a line 63 from a compressor or other suitable source (not shown) to supply fluid under pressure through line 64 to a pneumatic suspension system or to other accessories (not shown). Details of the pneumatic suspension system are not required for an understanding of the invention.

Referring to Fig. 3, the invention is shown embodied in an arrangement using a conventional one-piece brake pedal instead of the pedal and plunger arrangement shown in Fig. 1. In this embodiment, the valve 41 forms an extension of rod 9 and one end of the valve plunger 48 is pivotally connected to the brake pedal 11. The characteristics of the spring 52 are similar to those of the plunger spring 61 in Fig. 1 and the results obtained are the same with both arrangements. During normal service brake operation the pedal 11 moves in a first range between the full line position and the position indicated at 11a to actuate the booster 10 and the master cylinder 12 in the usual manner. Under these conditions the valve 41 is inoperative and moves as a unit with the rod 9.

Upon failure of the hydraulic service brake system, there will be a loss of fluid in the master cylinder 12 which will permit the pedal 11 to be moved from its first range into a second range between positions indicated at 11a and 11c. The master cylinder piston (not shown) will reach the end of its stroke when the pedal reaches the position indicated at 11b at which time the pedal cannot be moved farther without compressing the spring 52. Consequently, continued application of force to the pedal will compress the spring 52 and move the plunger 48 relative to the valve body to cause emergency braking as previously described.

Upon failure of the booster system formed by the vacuum source 21, line 22 and booster 10, and with the hydraulic system in good operating order, movement of the pedal 11 will be resisted by the fluid pressure developed in the master cylinder 12 and normal pedal movement will stop at some point before the position indicated at 11a. Further application of force to the pedal, that is, an abnormal force, will cause compression of the spring 52 and will move the plunger 48 relative to the valve body to effect emergency braking.

From the above it will be apparent that emergency braking can be effected by movement of the pedal in the first range when the booster system fails and by movement of the pedal in a second range when the hydraulic system fails. On the other hand the pedal moves in the first range for normal service brake operation when both the hydraulic and the booster arrangements of the service brake system are in good operating order.

The two secondary boosters 30 and 31 may be combined as shown in Fig. 4, into a double diaphragm, double piston booster 66 having a common working chamber 67 connected to line 58. Operation of the system, as modified, remains the same.

The preferred embodiments of the invention make it possible to use a brake system in which the brake pedal height from the vehicle floor board is approximately the same as that of the accelerator and yet very adequate and efficient emergency braking may be obtained without reliance on a large pedal stroke. This is accomplished by a system utilizing a novel arrangement of a foot pedal and an auxiliary source of pressure such that continued application of foot pressure after failure of the primary or service braking system, results in emergency power braking.

It should be understood that it is not intended to limit the invention to the particular forms and details described above, and that the invention includes such other forms and modifications as are embraced by the scope of the appended claims.

It is claimed and desired to secure by Letters Patent:

1. In a vehicle having a power hydraulic service brake system including a primary power booster means actuated by a foot pedal to combine manual and booster force in supplying hydraulic fluid under pressure through service brake lines to fluid pressure responsive brake actuators, an improved power emergency brake system comprising double acting check valve means in said service brake lines, secondary hydraulic booster means connected to said check valve means and being responsive to fluid under pressure to pass hydraulic fluid under pressure through said check valve means to said actuators, a source of fluid under pressure normally isolated from said brake system, valve means movable to admit fluid under pressure from said source to said secondary booster means to effect emergency braking, said valve means being arranged for movement by said foot pedal on overtravel thereof resulting from loss of hydraulic fluid in said service brake system, and preloaded spring means connected to said pedal and compressible under abnormal foot pedal pressure upon failure of said primary booster means to move said valve means relative to said pedal.

2. In a vehicle brake system including hydraulic means for displacing hydraulic fluid to brake applying motors and power assist means for actuating said hydraulic means, the combination of an emergency brake system including auxiliary hydraulic means operable alternately with said first mentioned hydraulic means, auxiliary power assist means for actuating said auxiliary hydraulic means, a source of pressure fluid for said auxiliary power means, valve means interposed between said auxiliary source and said auxiliary power means and movable in one direction to permit delivery of pressure fluid to said auxiliary means for applying emergency brakes, a pedal movable in a predetermined range when said hydraulic means are subject to hydraulic pressure and movable in a secondary range upon failure of hydraulic pressure, actuating means for said valve means including a part movable with said pedal in said secondary range of the latter to move said valve means upon failure of hydraulic pressure, and spring means associated with said part to resist movement of the latter relative to said pedal upon application of a normal force to said pedal when the latter is in either of said ranges, said spring means being yieldable upon application of an abnormal force to said pedal when the latter is maintained in said predetermined range to actuate said valve means.

3. In a vehicle brake system having hydraulic means and booster means for actuating said hydraulic means in response to movement of a pedal and in which the pedal is movable in a first range when said hydraulic means is in working order and said booster means has failed and being movable in a second range upon failure of said hydraulic means, an emergency system including power brake means, an independent source of power for said power brake means, valve means movable to place said source in communication with said power brake means for actuating the latter, operating means for moving said valve means connected to said pedal for movement relative thereto, and spring means providing a predetermined force resisting movement of said operating means relative to said pedal upon application of a normal force on said pedal when said hydraulic system fails, said operating means being movable relative to said pedal upon application of a manual force in excess of said predetermined force to move said valve means following failure of said booster means.

References Cited in the file of this patent

UNITED STATES PATENTS

| 2,240,166 | Stanley | Apr. 29, 1941 |
|---|---|---|
| 2,373,272 | Stelzer | Apr. 10, 1945 |
| 2,539,538 | Hayes | Jan. 30, 1951 |
| 2,767,548 | Ayers | Oct. 23, 1956 |
| 2,776,734 | Hackett | Jan. 8, 1957 |
| 2,871,827 | Euga | Feb. 3, 1959 |